(12) United States Patent
Sauschuck, Jr. et al.

(10) Patent No.: US 8,127,436 B2
(45) Date of Patent: Mar. 6, 2012

(54) DEVICE FOR INSTALLING AERIAL ELECTRICAL POWER LINES

(75) Inventors: James Michael Sauschuck, Jr., Sparrowbush, NY (US); Ronald William Mege, Port Jervis, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 574 days.

(21) Appl. No.: 12/362,709

(22) Filed: Jan. 30, 2009

(65) Prior Publication Data

US 2010/0192373 A1  Aug. 5, 2010

(51) Int. Cl.
  *B23P 19/00* (2006.01)
(52) U.S. Cl. ............. 29/760; 29/757; 29/764; 248/74.1; 248/218.4; 248/219.2
(58) Field of Classification Search .................. 29/760, 29/402.08, 402.12, 426.4, 757, 764, 868, 29/897, 897.3, 897.31; 248/74.1, 188.2, 248/218.4, 219.2
  See application file for complete search history.

(56) References Cited

U.S. PATENT DOCUMENTS

| 3,244,292 | A | 4/1966 | Elliott |
| 4,615,154 | A * | 10/1986 | Troutner ........................... 52/40 |
| 6,520,462 | B2 * | 2/2003 | Herron ....................... 248/218.4 |
| 6,892,990 | B2 | 5/2005 | Pisczak |
| 7,007,438 | B1 * | 3/2006 | Shields et al. ............. 52/745.19 |
| 7,137,616 | B2 | 11/2006 | Kysely |
| 7,290,748 | B2 | 11/2007 | McDonald |
| 7,396,252 | B2 | 7/2008 | Rocker et al. |
| 2002/0034369 | A1 | 3/2002 | Forrester et al. |
| 2003/0183733 | A1 | 10/2003 | Pisczak |

* cited by examiner

*Primary Examiner* — Thiem Phan
(74) *Attorney, Agent, or Firm* — Cantor Colburn LLP

(57) ABSTRACT

A device for installing aerial electrical power conductors on utility poles. The device includes a frame having a plurality of anchors. The anchors are arranged to provide a place for securing a plurality of pull ropes during installation of the conductors. The device includes a post sized to be received in a hitch on a vehicle. In one embodiment, the device is sized to fit into an aerial platform, such as that used on utility bucket trucks. The device may be lifted to the point of connection on the utility pole.

5 Claims, 11 Drawing Sheets

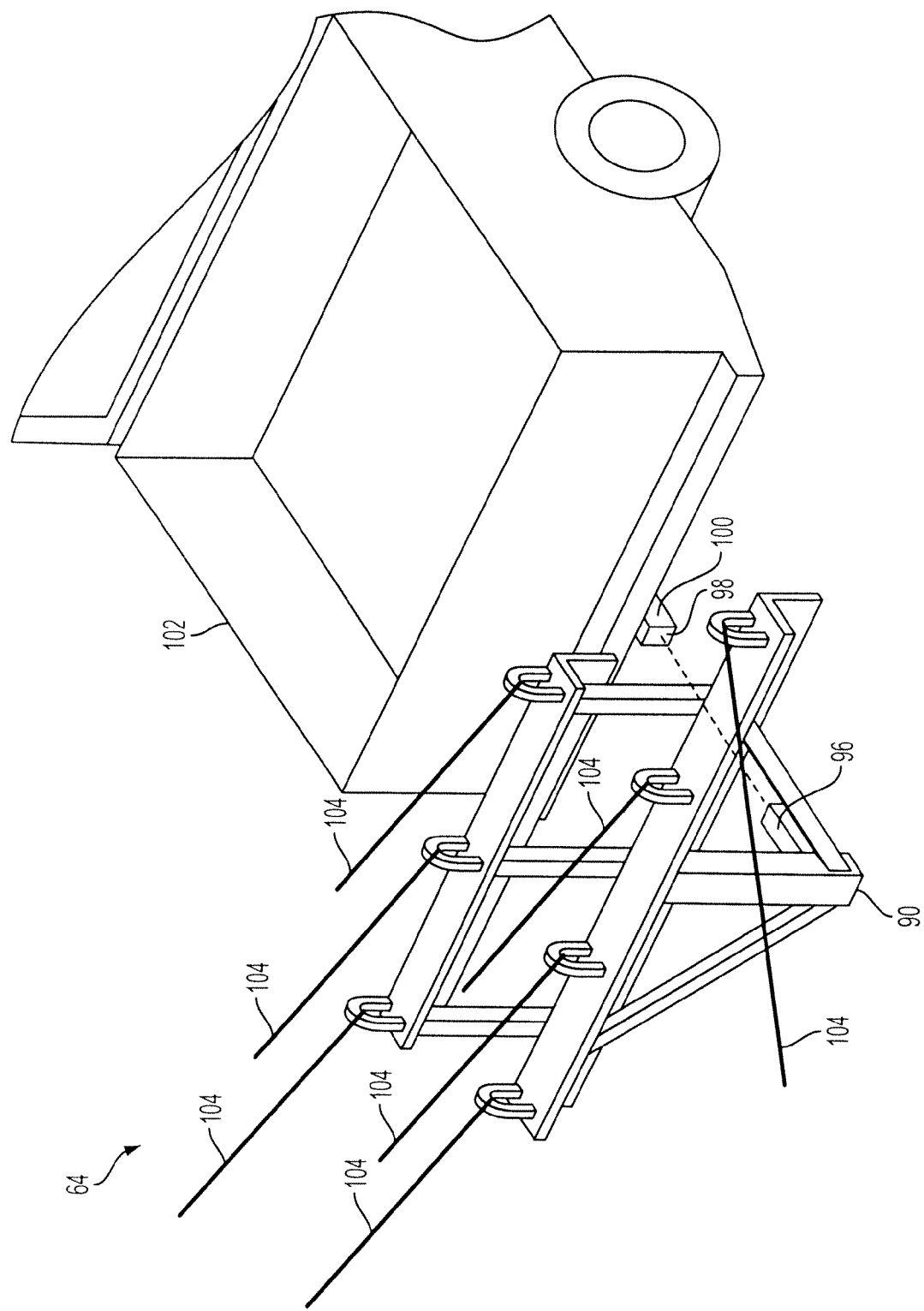

DEVICE FOR INSTALLING AERIAL ELECTRICAL POWER LINES

BACKGROUND OF THE INVENTION

The present invention relates generally to a device for installing aerial electrical power lines and in particular to a device that manages ropes and cables during the installation process.

Residential homes typically have three conductors entering the building from the street utility electric lines. Two of the conductors are power conductors each carrying a single phase of electricity. Meaning the waveforms of the electricity on the two conductors are typically out of phase by 180 degrees. The third conductor entering the building is what is known as a neutral phase, which connects to earth ground. While the neutral may carry current, it normally will have no electrical potential or voltage. Each phase of the power conductors connects with one branch of 120V circuits within the building. Where 240V is required, for a stove or electric clothes dryer for example, both power conductors are used for that circuit.

The conductors extend from the residential homes through an electrical distribution network to substations that typically transition to a high voltage transmission network. In addition to the conductors, the distribution network may include further equipment, such as transformers, switches, circuit breakers and other devices that assist in the control and delivery of electrical power. The conductors may be positioned either underground, or more commonly above ground, suspended from poles that may also be used for routing other utilities such as telephone and television cables.

Placement of the conductors on utility poles provides a convenient routing of the conductors by allowing the area around the cables to be safely utilized while inhibiting vandalism for example. However, since the conductors are suspended 20 feet (6 meters) or more above the ground, it also presents some challenges when the conductors need to be installed. Conductors may be installed on a pole during several points in time, during initial deployment, in the event they are damaged by a storm or accident, or during upgrades of the network for example.

Since the weight of the conductors is too large for the conductors to be pulled directly, the installation process typically has several steps. First a rope is coupled to each pole where the conductor is to be installed. The opposite end of the rope is tied to a cable, such as a stranded-wire steel cable for example. The rope is then used to pull the cable up to suspension point on each pole. Finally, the end of the cable is tied to the conductor. Since the cable is strong enough to pull the conductor without breaking, the cable is used to pull the conductor up to the suspension point on the pole.

While the process for installing a single conductor is simple, the utility crew often needs to install multiple conductors to the same pole. The most common configurations involve a single 3-wire circuit, having three power conductors plus a neutral conductor, and two 3-wire circuits, having six power conductors plus a neutral conductor. Since the conductors are all installed at the same time, problems commonly arise due to the number of ropes and cables suspended from the pole. During installation the ropes need to be maintained in their correct order and spatial orientation, otherwise the conductors will cross. Since conductors are not allowed to cross, in the event a rope becomes tangled or crossed during installation, the ropes may need to be disconnected from the utility pole and reinstalled. This results in lost time and increased costs.

Correct installation becomes even more difficult in applications where the two 3-wire circuits are utilized since the utility crews typically only have ropes in four colors. To avoid incorrect installation, the utility personnel must be diligent in maintaining the ropes in the correct positions. Even when no mistakes are made, the increased diligence slows the process, which in turn increases time and cost.

While existing systems and methods for the aerial installation of electrical conductors are suitable for their intended purposes, there still remains a need for improvements particularly regarding the handling and securing of installation ropes to increase the speed and reliability of installation.

SUMMARY OF THE INVENTION

A device for installing aerial electrical lines is provided. The device includes a frame having a first cross arm. A second cross arm is arranged adjacent to, and substantially parallel to, the first cross arm. A first post is arranged to extend substantially perpendicular to the first cross arm. A first plurality of anchors is coupled to said the cross arm. A second plurality of anchors is coupled to the second cross arm.

Another embodiment of the device for installing aerial power lines is also provided. The device includes a first post having a first and second end. A second post is coupled to the first end and extends substantially perpendicular to the first post. The second post is sized to be received in a trailer hitch. A first cross arm is coupled to the first post second end. A third post is coupled on an end to the first cross arm. A second cross arm is coupled to the third post on an end opposite the first cross arm. A first plurality of anchors is coupled to the first cross arm, each of the first plurality of anchors having a first opening sized to receive a rope. A second plurality of anchors is coupled to the second cross arm, each of the second plurality of anchors having a second opening sized to receive a rope.

A method of installing aerial electrical lines is also provided. The method includes the steps of coupling a first rope to a first pole. Coupling a first end of the first rope to a first anchor, the first anchor being coupled to a frame that is mounted to a vehicle. Moving the vehicle to a second pole. Removing the first rope from the first anchor. Coupling the first rope to the second pole and reattaching the first rope to the first anchor.

BRIEF DESCRIPTION OF THE DRAWINGS

Referring now to the drawings, which are meant to be exemplary and not limiting, and wherein like elements are numbered alike:

FIG. 7 is a perspective view illustration of the device of FIG. 4 coupled to a vehicle for installing power lines in accordance with an embodiment of the invention;

DETAILED DESCRIPTION

Figure 1:
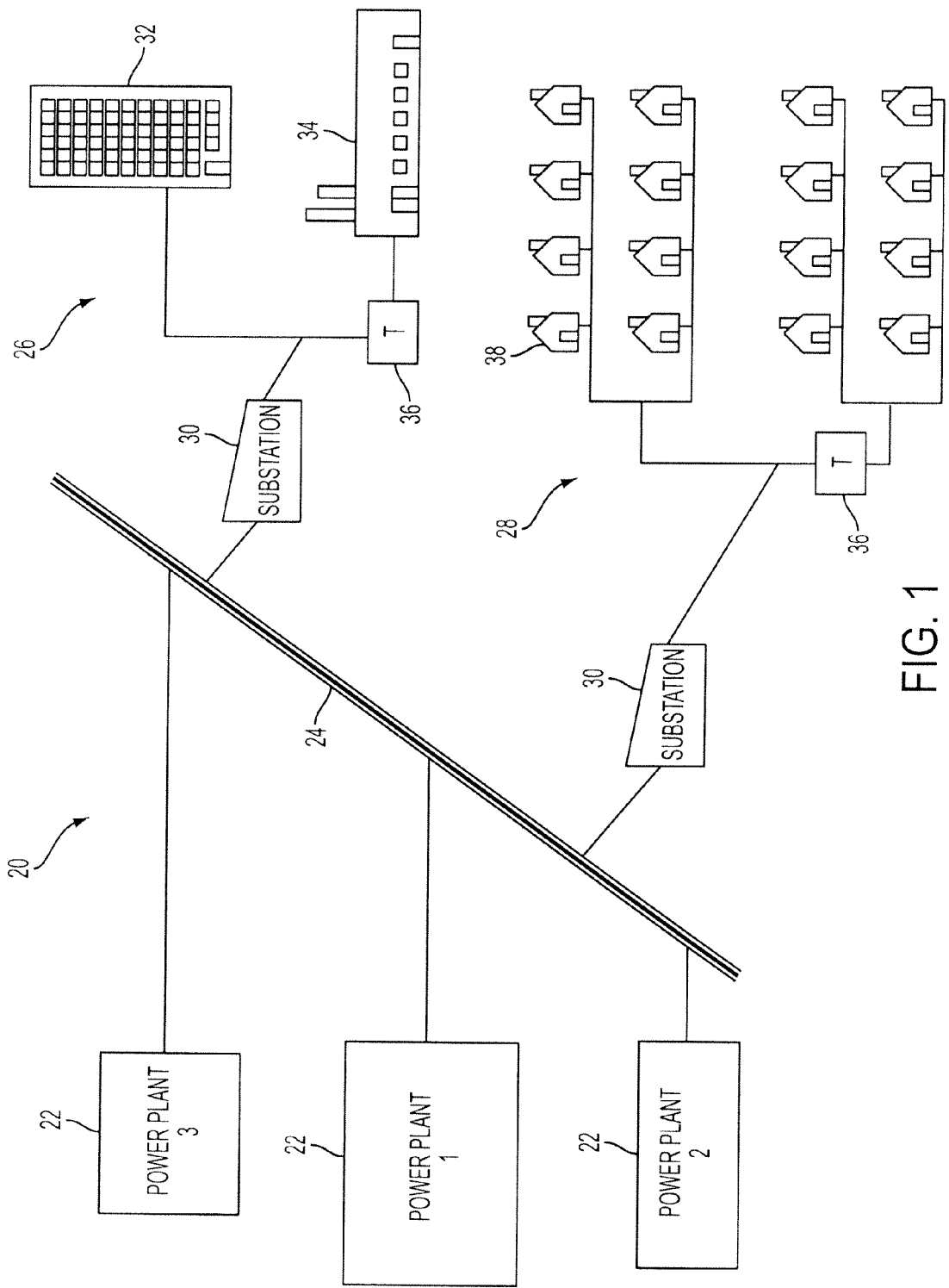
FIG. 1 is a schematic illustration of a utility electrical distribution system.

FIG. 1 illustrates an exemplary embodiment of a utility electrical distribution network 20. The utility network 20 includes one or more power plants 22 connected in parallel to a main distribution network 24. The power plants 22 may include, but are not limited to: coal, nuclear, natural gas, or incineration power plants. Additionally, the power plants 22 may include one or more hydroelectric, solar, or wind turbine power plants. It should be appreciated that additional components such as transformers, switchgear, fuses and the like (not shown) may be incorporated into the utility network 20 as needed to ensure the safe and efficient operation of the system. The utility network 20 may be interconnected with one or more other utility networks to allow the transfer of electrical power into or out of the electrical network 20.

The main distribution network 24 typically consists of medium voltage power lines, less than 50 kV for example, and associated distribution equipment which carry the electrical power from the point of production at the power plants 22 to the end users located on local electrical distribution networks 26, 28. The local distribution networks 26, 28 are connected to the main distribution network by substations 30 which adapt the electrical characteristics of the electrical power to those needed by the end users. Substations 30 typically contain one or more transformers, switching, protection and control equipment. Larger substations may also include circuit breakers to interrupt faults such as short circuits or over-load currents that may occur. Substations 30 may also include equipment such as fuses, surge protection, controls, meters, capacitors and voltage regulators.

The substations 30 connect to one or more local electrical distribution networks, such as local distribution network 26, for example, that provides electrical power to a commercial area having end users such as an office building 32 or a manufacturing facility 34. Local distribution network 26 may also include one or more transformers 36 which further adapt the electrical characteristics of the delivered electricity to the needs of the end users. Substation 30 may also connect with other types of local distribution networks such as residential distribution network 28. The residential distribution network 28 may include one or more residential buildings 38 and also light industrial or commercial operations.

Figure 2:
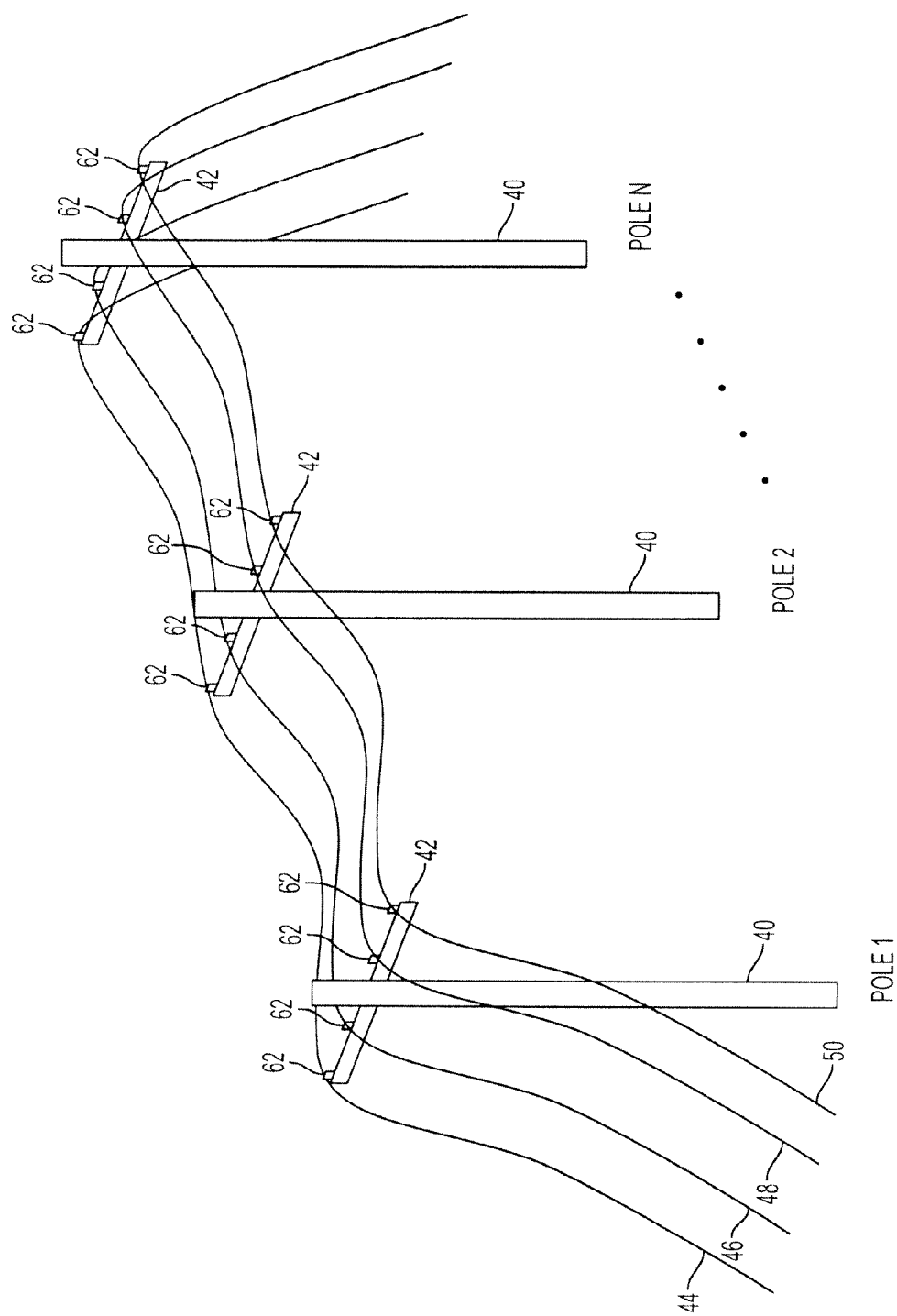
FIG. 2 is a perspective view illustration of a set of power utility poles having a three wire circuit with a neutral wire.
Figure 3:
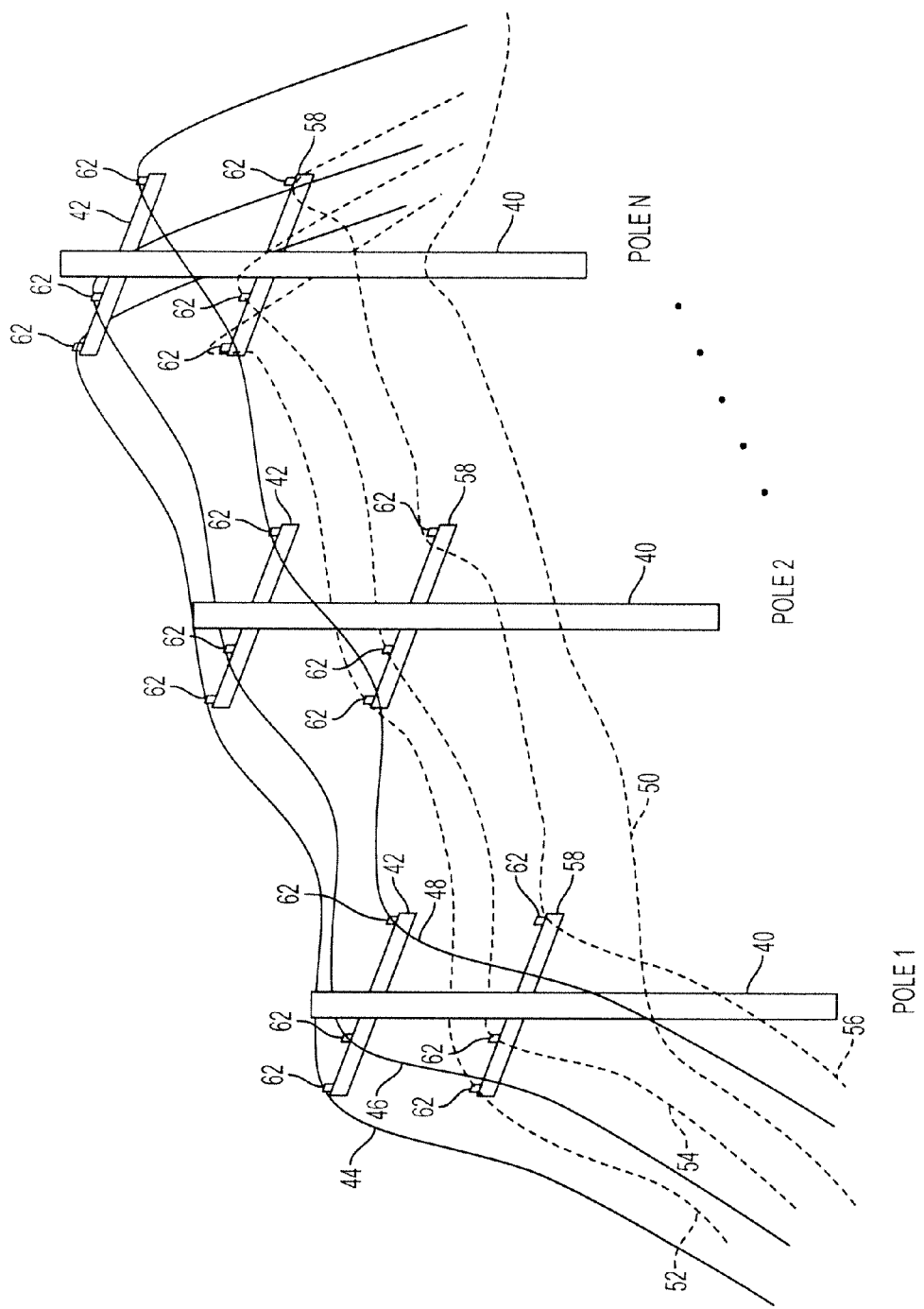
FIG. 3 is a perspective view illustration of a set of power utility poles having two three wire circuits with a neutral wire.

The local distribution networks 26, 28 typically include one or more circuits having three power conductors and a neutral conductor. When two circuits are co-located on a utility pole, the circuits may share a neutral conductor. Since the end user loads, such as residential building 38 for example, may be located some distance from the substation 30, the conductors are typically installed either underground, or more commonly by suspending the conductors from a cross-arm attached to a utility pole. FIG. 2 and FIG. 3 illustrate two types of aerial installation configurations. FIG. 2 shows a set of utility poles 40 each having a cross arm 42. The cross arms 42 are arranged at a sufficient height, typically 20 feet (6 meters) above ground, to allow safe routing of the circuit while allowing the surrounding environment to be used for other purposes.

In the single 3-wire configuration, four conductors are used. Three of the conductors 44, 46, 48 transfer electrical power, while the fourth conductor 50 is a neutral. Typically, the three power conductors 44, 46, 48 are mounted to the cross arm 42 and the neutral conductor 50 is mounted directly to the utility pole 40 approximately four feet (1.22 meters) below the cross arm 42. In the configuration shown in FIG. 3, two 3-wire circuits are coupled to the utility pole 40. The second circuit also includes three power conductors 52, 54, 56 for transferring electrical power and are mounted to a second cross arm 58. Generally, the first cross arm 42 and the second cross arm 58 are spaced a sufficient distance apart allow each phase electrical power to be transferred without interference from the adjoining phases or circuits. As discussed above, where two 3-wire circuits are co-located, the neutral conductor 60 may be shared. The conductors are attached to the utility poles 40 using devices, such as an insulator for example, as is known in the art. During the installation, a u-shaped bracket 62 is coupled to the cross arm 42, 58. As will be discussed in more detail below, the u-shaped bracket allows the ropes, cables and conductors to be securely pulled across multiple utility poles 40 during installation. In the event that other utilities (not shown), such as cable or telephone for example, are also attached to the utility pole, these utilities are attached below or closer to the ground than the electrical power conductors.

The arrangements of the conductors in FIG. 2 and FIG. 3 are meant to be exemplary and not limiting. The conductors may also being mounted to the utility poles in other configurations. For example, in some areas it is common to mount the neutral conductor to the cross arm 42 rather than directly on the utility pole 40. Alternatively, the cross arm 42 may be eliminated and the individual conductors attached directly to the utility pole with an appropriate spacing between the conductors. Accordingly, the claimed device and method should not be limited by the type or configuration of the conductors on the utility poles 40.

It should be appreciated that it is desirable to minimize the number of breaks in the conductors. Often, utility personnel will need to raise and install the conductors over 20 feet (6 meters) in the air across a span of ten to fifteen poles. Since the weight of a long length of conductor has considerable weight, care must be taken during the installation. As will be discussed in more detail below, the installation first uses a rope that is strung through the brackets 62. The ropes are then pulled and attached to each of the utility poles where installation is desired. The ropes are used to pull a high strength steel cable through the brackets. The steel cable in turn then has sufficient strength to pull the conductors through the brackets 62.

Figure 4:
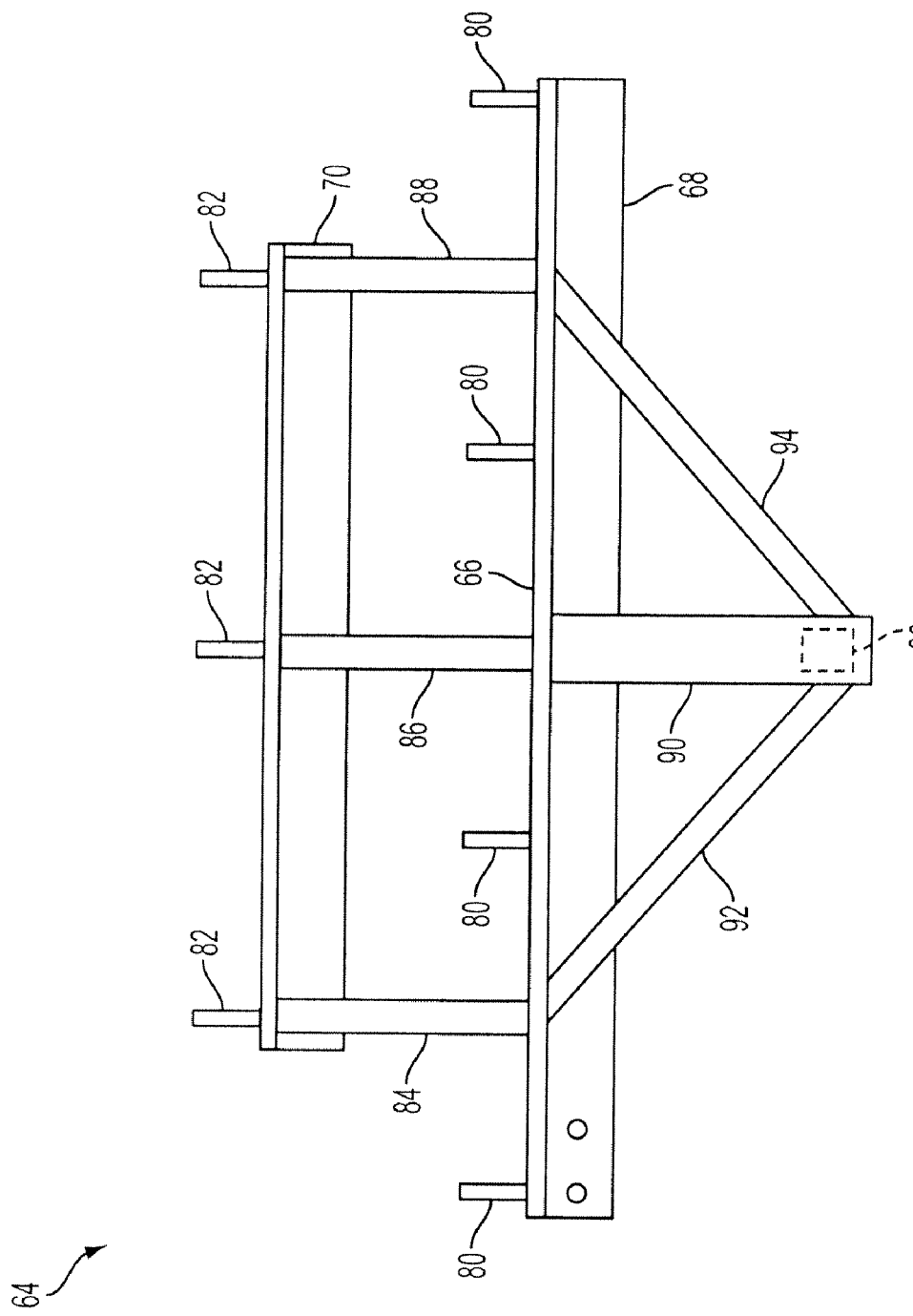
FIG. 4 is a front plan view of the device in accordance with an embodiment of the invention.
Figure 6:
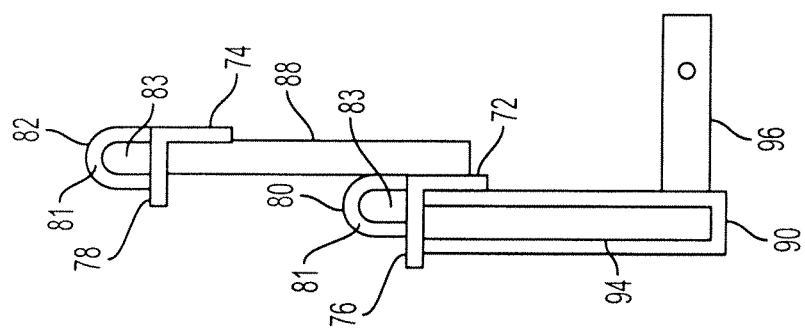
FIG. 6 is a side plan view of the device of FIG. 4
Figure 5:
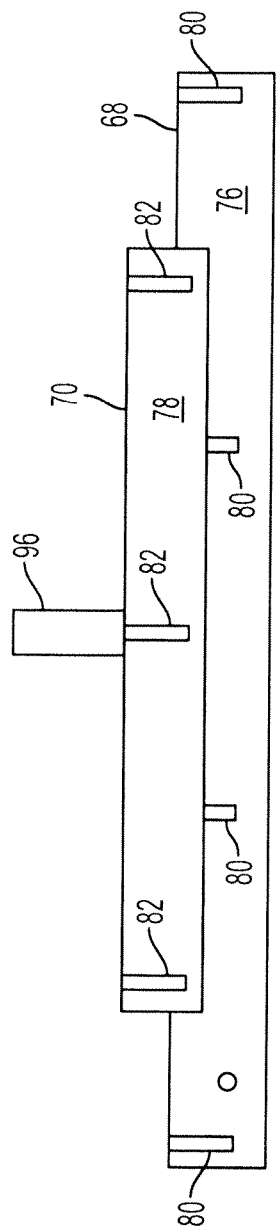
FIG. 5 is a top plan view of the device of FIG. 4.

Referring now to FIGS. 4-6, a device 64 for aiding the aerial installation of electrical conductors is shown. The device 64 includes a frame 66 having a first cross bar 68 and a second cross bar 70. In the exemplary embodiment, the cross bars 68, 70 are made from a L-shaped bracket having a back portion 72, 74 and a planar portion 76, 78 respectively. Coupled to the planar portions 76, 78 are coupled a plurality of anchors 80, 82. In the exemplary embodiment, the first cross bar 68 has four anchors 80 and the second cross bar 70 has three anchors 82. The anchors 80, 82 may be coupled to the cross bars 68, 70 by any method with sufficient strength, such as welding or a bolted joint for example, to withstand the load of a rope being pulled.

In the exemplary embodiment, each anchor 80, 82 include a solid ring portion 81 with an opening 83 therethrough. The opening 83 is sized to be sufficiently large to allow the utility personnel to tie a rope thereto. Alternatively, other anchors suitable for securing ropes may also be used. The anchors 80, 82 may also be a cleat, a mushroom anchor, a shackle, a clip, a carbineer, or a rope clutch for example.

In the exemplary embodiment, the first cross bar 68 and the second cross bar 70 are connected together by a first post 84, a second post 86 and a third post 88. It should be appreciated that more or less posts may be used for joining the first cross bar 68 and the second cross bar 70 without deviating from the scope of the claimed invention. In the exemplary embodiment, the posts 84, 86, 88 are made from a cylindrical tube welded to the back portion 72 of first cross bar 68 and to the back portion 74 of second cross bar 70. The posts 84, 86, 88 are arranged substantially beneath the anchors 82.

Extending from the first cross bar 68 is a fourth post 90. The fourth post 90 extends in a direction substantially perpendicular to the planar portion 76. In the exemplary embodiment, the fourth post 90 is a square extruded tube stock welded to the back portion 72. A pair of cross-braces 92, 94 join the bottom of the fourth post 90 to the first cross bar 72. The cross brace 92 is joined to the planar portion 76 adjacent first post 84, while cross brace 94 is joined to the planar portion 76 adjacent third post 88. In the exemplary embodiment, the cross braces 92 are made from a cylindrical extruded tube stock and welded to the fourth post 90 and the first cross bar 68.

Extending from the fourth post 90 is a fifth post 96. The fifth post extends in a direction substantially perpendicular to a plane formed by the first cross bar 68 and the fourth post 90. In the exemplary embodiment, the fifth post 96 is sized to fit within a receiver portion 98 of a hitch 100 on vehicle 102 as illustrated in FIG. 7. This provides advantages in that the device 64 may be easily transported during use, and the vehicle may be used to pull the ropes and cables used during the installation process. It should be appreciated that these advantages reduce both the time and cost of installing aerial electrical power conductors.

In the exemplary embodiment, the device 64 is constructed from steel components that have sufficient strength to withstand the forces generated by pulling the ropes. Alternatively, the device 64 may also be made from aluminum, a composite material, or a combination of the above.

Figure 8:
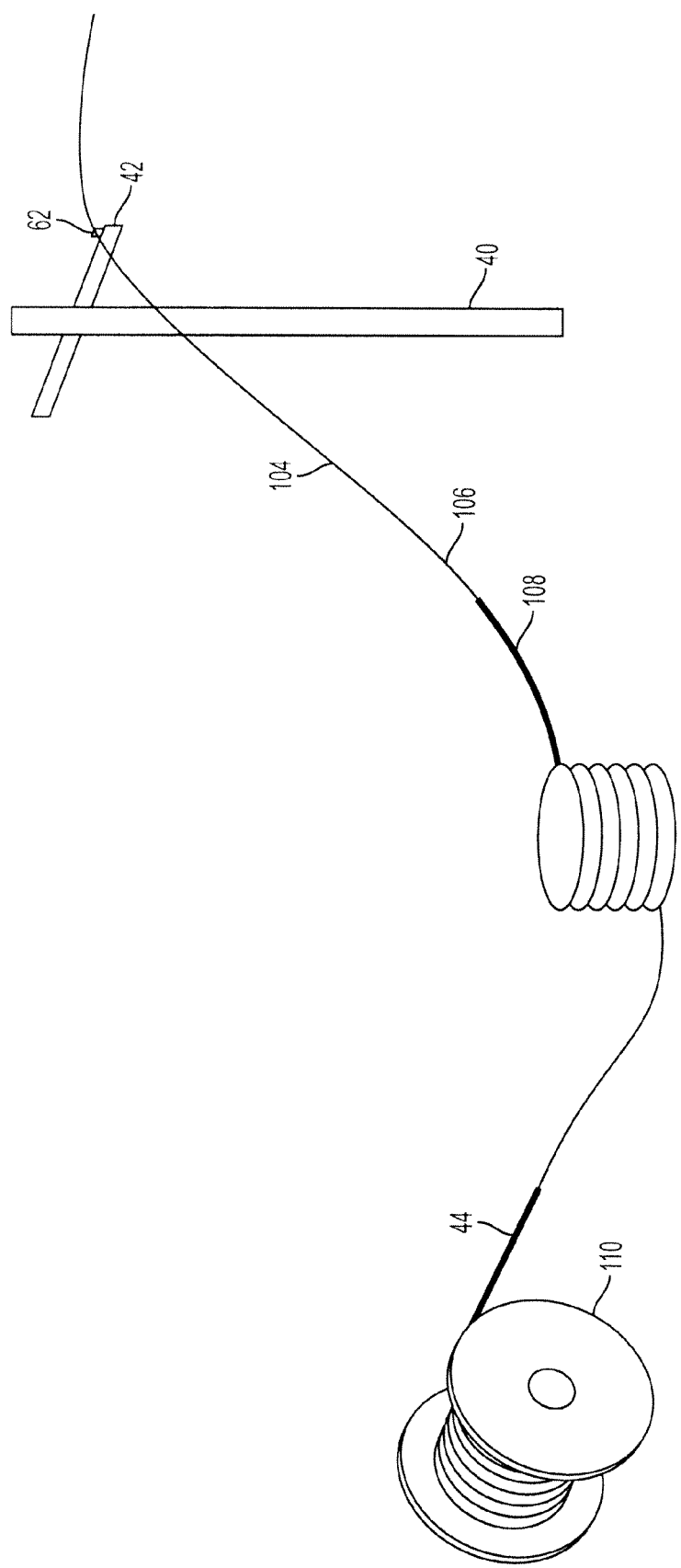
FIG. 8 is a perspective view illustration of power line being arranged for aerial installation in accordance with an embodiment of the invention.

As discussed above, a rope 104 is coupled to the first utility pole 40 by a bracket 62 as shown in FIG. 8. It should be appreciated that while a single rope 104 is illustrated in FIG. 8, this is for clarity purposes only, and an individual rope 104 is used for each conductor to be installed. For example, in an application having two 3-wire circuits, a total of seven ropes are used. One end 106 of the rope 104 is coupled to a cable 108. An opposite end of the cable 108 is coupled to a conductor, such as power conductor 44 for example. Typically, conductors are stored on a spool 110 allowing long lengths of conductor to be transported and dispensed in the field.

Figure 9:
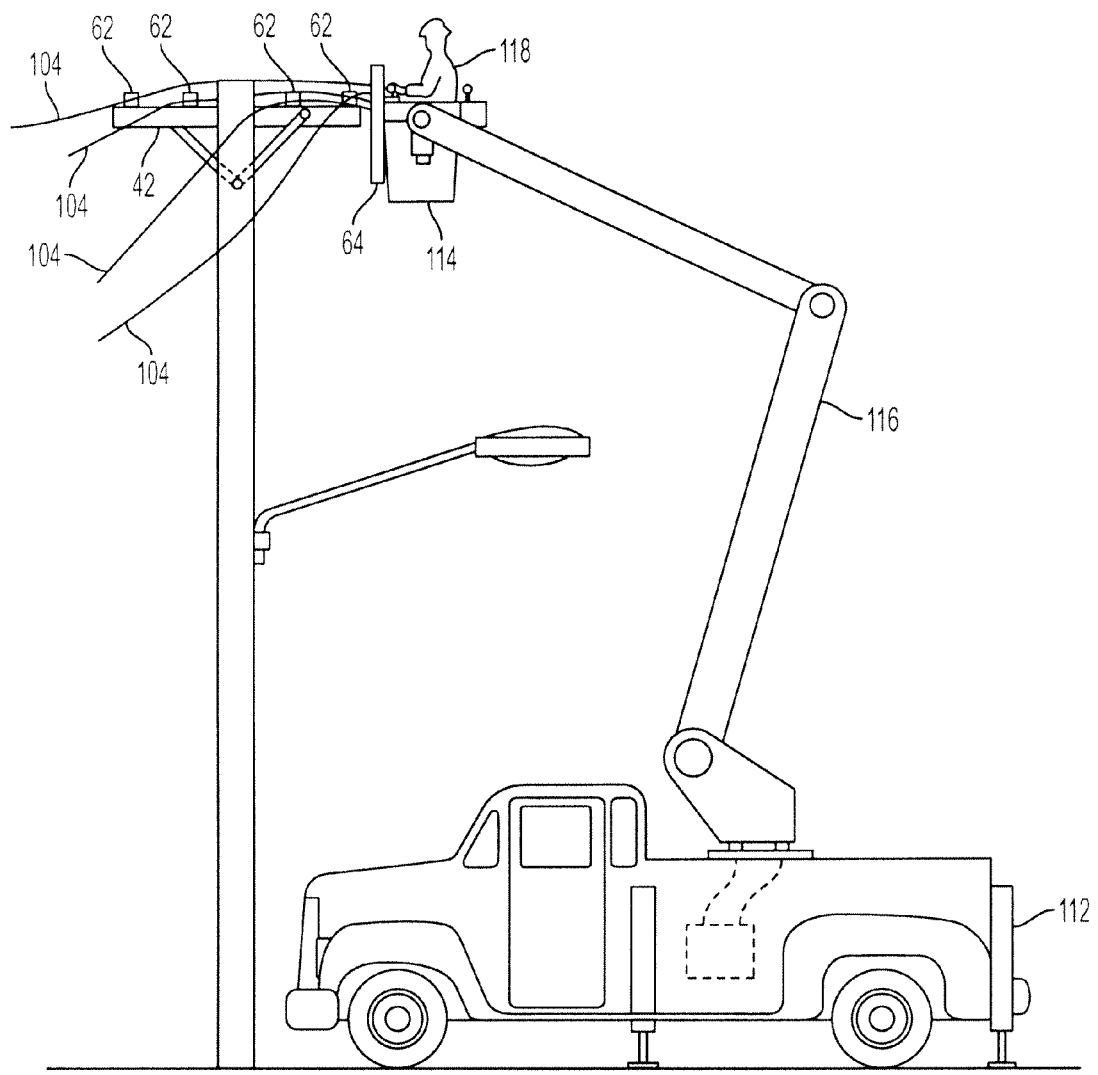
FIG. 9 is an illustration of an embodiment of the invention using a bucket truck with the device of FIG. 4.

Once each of the ropes 104 are coupled to the first utility pole 40, each of the ropes 104 are tied to an individual anchor on the device 64 as shown in FIG. 7. The vehicle 102 is then used to pull the ropes 104 to the next utility pole 40. The ropes 104 are then coupled to the next utility pole 40. Since the device 64 firmly maintains the ropes 104 apart during the transportation between utility poles 40, the opportunity for ropes 104 being confused, tangled or crossed is reduced. In one embodiment, an aerial bucket truck 112 is used to facilitate the attachment of the ropes 104 to the cross arm 42 as is shown in FIG. 9. An aerial bucket truck is a vehicle having a movable work platform 114 that typically includes hydraulically activated boon 116 that is controllable by the utility personnel 118. This allows the utility personnel to be quickly and easily transported to the top of the pole 40 to perform repairs.

In the embodiment shown in FIG. 9, the device 64 is adapted to be coupled to the platform 114. The device 64 may be coupled to the platform 114 in a number of ways. In the exemplary embodiment, the device 64 is placed on the platform 114. Alternatively, a hitch (not shown) sized to receive the fifth post 86 may be mounted to the platform 114. It should be appreciated that by transporting the device 64 to the cross arm 42, this embodiment provides a number of advantages in reducing the opportunity for errors and speed of installation. Since the ropes 104 are tied to the device 64 in the same configuration as they are arranged on the utility pole 40, the ropes 104 may be easily, quickly and reliably coupled to a series of utility poles 40 without risk of tangling, crossing ropes or installing ropes to the wrong bracket 62.

Figure 10:
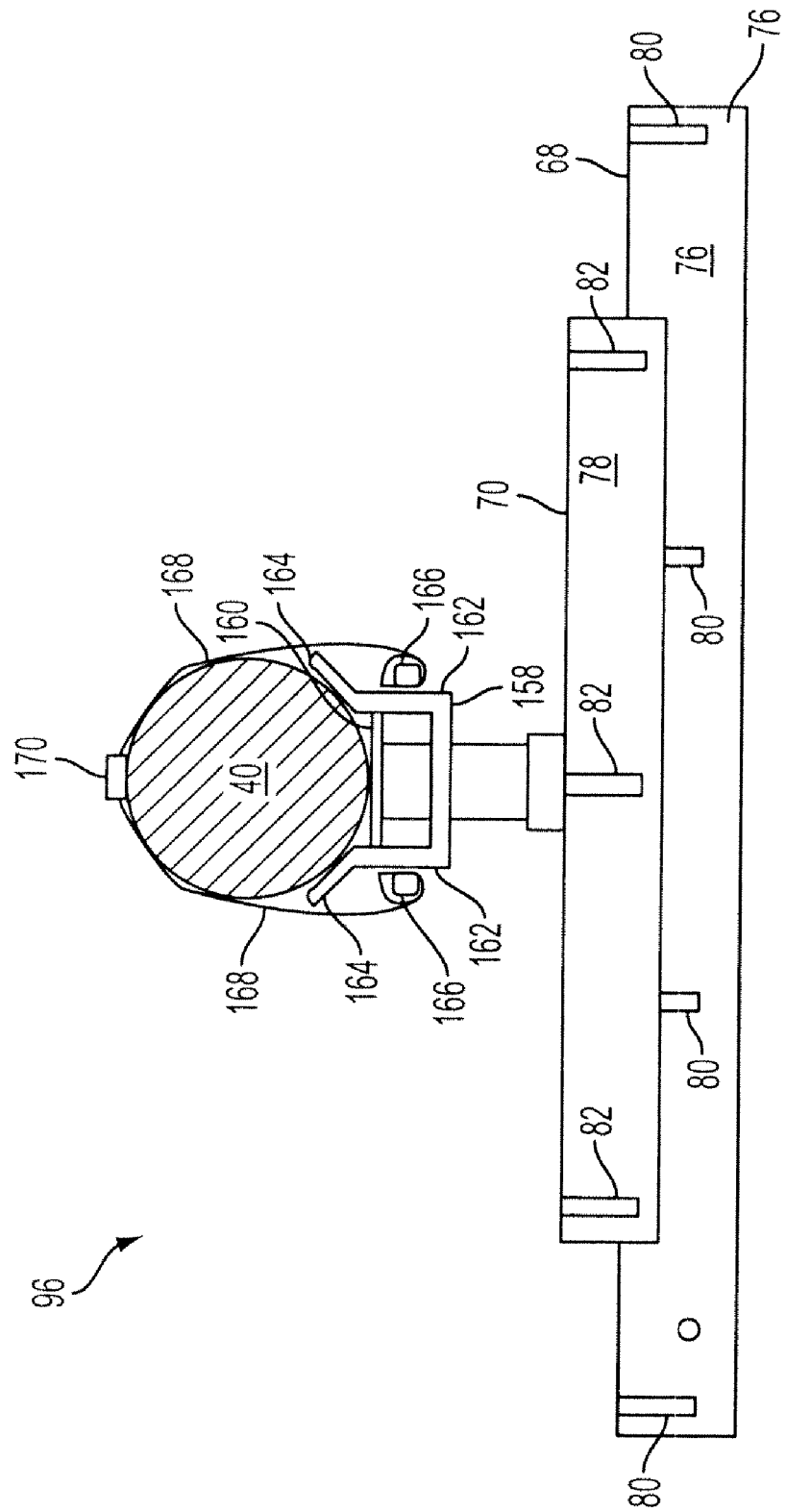
FIG. 10 is a top plan view illustration of an embodiment of the invention having an adaptor to secure the device to a utility pole.
Figure 11:
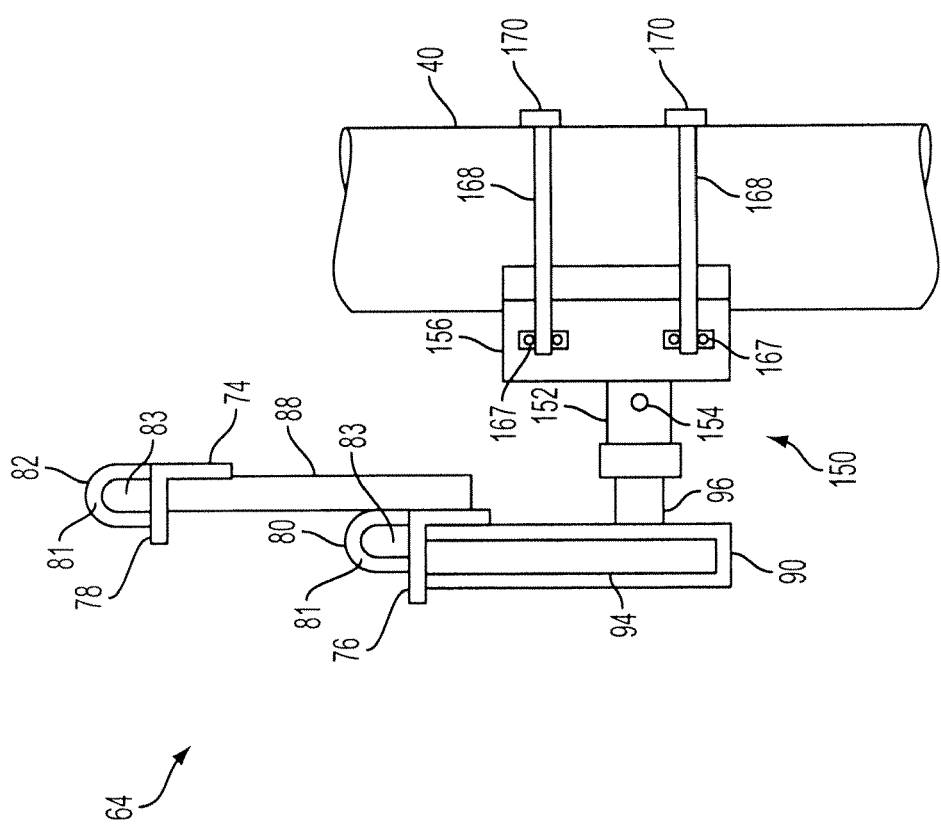
FIG. 11 is a side plan view illustration of the embodiment of the invention having the adaptor of FIG. 10; and, FIG. 12 is a flow chart illustration of the method of installing aerial power lines using the device of FIG. 4.

In some circumstances, it may be desirable to secure the device 64 to the utility pole 40 for a period of time. For example, at the end of a workday, utility personnel may want to leave the ropes 104 coupled to the device 64, but want to secure the device to avoid unauthorized tampering. FIG. 10 and FIG. 11 illustrate an optional adapter 150 that couples to the post 96 in a similar manner to the hitch 100 on vehicle 102. The adapter 150 includes a receiver portion 152 that is adapted to receive the post 96 on device 64. An opening 154 in the receiver portion 154 is sized to receive a pin to secure the adaptor 150 to the device 64.

The receiver portion 152 is coupled to a bracket 156. The receiver portion 152 extends through a wall 158 of the bracket 156 and is coupled to a cross member 160. The cross member 160 is coupled, such as through welding for example, between a pair of side walls 162 that extend from wall 158 on either side of the receiver portion 152. A pair of flanges 164 extends from the end of sidewalls 162. The adapter 150 also includes a plurality of handles 166. The handles 166 are attached to the sidewalls 162 and provide an attachment point for at least two harnesses or straps 168. In the exemplary embodiment, there are four handles 166. Each of the straps 168 includes a fastener 170, such as a buckle for example, that cooperate with each other to fasten the straps 168 together. In the exemplary embodiment, the handles 166 are attached to the sidewalls 162 by bolts 167, however other fastening methods may be used, such as welding for example When the utility personnel desire to mount the device 64 to a utility pole 40, the adapter 150 is mounted to the post 96. With the adapter 150 mounted, the device 64 is raised to the desired location, such as with bucket truck 112 for example. The flanges 164 are then placed in contact with the utility pole 40. With the adapter 150 in place, the straps 168 are wrapped around the utility pole and connected together. The straps 168 are then tightened and the adapter 150 and device 64 are secured to the utility pole.

Figure 12:
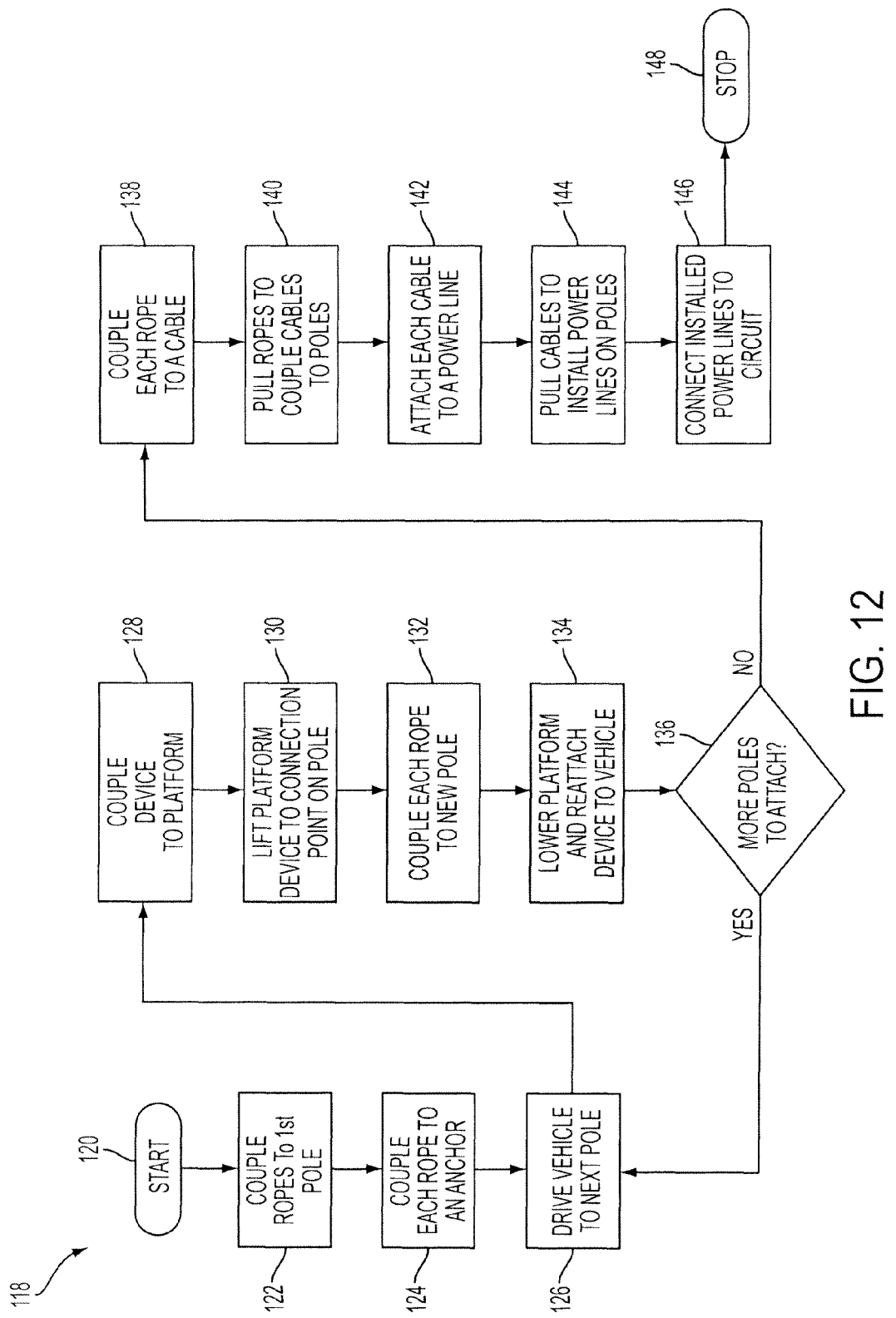

Turning now to FIG. 12, a method 118 for the aerial installation of electrical power conductors in a multi-conductor circuit will be described. The method 118 begins in start block 120 and proceeds to block 122 where the ropes 104 are slidably coupled to the first utility pole 40 that the conductors are to be installed. One end of each rope 104 is tied to an anchor location on the device 64 in block 124. In the exemplary embodiment, the ropes 104 are tied to the device 64 in the same order and configuration as the ropes are coupled to the first utility pole 40. If the device 64 is not already coupled to the vehicle 102, the device 64 is mounted to the vehicle 102, the vehicle 102 is driven to the next utility pole 40 the conductors are to be mounted in block 126.

Once the vehicle 102 has arrived at the next pole, the device 64 is mounted to, or positioned on, the platform 114 in block 128. The platform 114 is then raised to the height of the cross arm 42, 58 in block 130. With the platform 114 at the appropriate height, each of the ropes 104 may then be slidably coupled to the brackets 62 on the cross arms 42, 58 in block 132 while facilitating the order and configuration of the ropes 104 to avoid crossing and tangling. The platform 114 is then lowered in block 134 and reattached to the vehicle 102. It should be appreciated that if the aerial platform equipment is not available, block 128 and block 130 may be accomplished utility personnel by manually climbing the utility pole, or using ladders for example.

Query block 136 determines whether there are more utility poles 40 to which the conductors need to be attached. If query block 136 returns an affirmative response, the method 118 loops back to block 126 where the vehicle 102 is driven to the next utility pole 40 and the steps of attaching the ropes 104 to the next utility pole 40 repeats.

If query block 136 returns a negative, this indicates that the utility personnel are at the end of the series of utility poles 40 to which they are installing the new conductors. Depending on the environment in which the utility poles are located, the utility personnel may couple the conductors to 10 to 15 utility poles for example. If the utility poles are spaced 150 feet (46 meters) apart on average, the ropes 104 may be coupled over a distance of 1000 feet (305 meters) to over 2000 feet (610 meters). Upon a negative response from query block 136, the method 118 proceeds to block 138 where the ends of ropes 104 located at the first utility pole 40 are attached to cables 108, where there is a corresponding individual cable 108 for each rope 104.

The ropes 104 are then pulled at the location of the last utility pole 40 in which the ropes 104 were coupled in block 140. By pulling the ropes 104, the cables 108 are then slidably coupled to each of the utility poles 40. Once the cables 108 are pulled to the location of the last utility pole 40, the conductors are coupled to the cables 108 at the location of the first utility pole 40 in block 142. As with the connection of the cables 108 to the ropes 104, there is one cable 108 for each conductor to be installed.

The method then proceeds to block 144 where the cables 108 are used to pull the conductors causing the conductors to be slidably coupled to each of the utility poles 40. Once the cable 108 has been pulled to the last utility pole 40, the conductors will be slidably coupled to each of the utility poles 40 to which the conductors will be installed and the conductors are attached to each of the utility poles 40 in block 146 and the circuits adjoining the newly installed conductors before method 118 terminates in block 148. It should be appreciated that the conductors are coupled to the utility poles using methods known to those skilled in the art, such as through devices such as isolators (not shown) for example.

The embodiments described herein provide a device that provides an improved solution for the aerial installation of electrical power conductors. The device provides a single holder for managing a plurality of ropes and cables. Further, the device provides additional advantages. The device secures the installation ropes during transportation. The device further minimizes the risk of the ropes being crossed or tangled since the ropes may be adequately separated and secured in the same order and configuration as attached to the utility poles. In installations involving multiple circuits, the risk of confusing which rope is associated with which circuit may also be minimized. Also, the device is arranged to be moved between a truck hitch and an aerial work platform that further minimizes the handling of the ropes, allowing for an increased reliability and reduced costs in installing new conductors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for installing aerial power lines, said device comprising:
   a first post having a first and second end;
   a second post coupled to said first end and extending substantially perpendicular to said first post, said second post being sized to be received in a trailer hitch;
   a first cross arm coupled to said first post second end;
   a third post coupled on an end to said first cross arm;
   a second cross arm coupled to said third post on an end opposite said first cross arm;
   a first plurality of anchors coupled to said first cross arm, each of said first plurality of anchors having a first opening sized to receive a rope; and,
   a second plurality of anchors coupled to said second cross arm, each of said second plurality of anchors having a second opening sized to receive a rope.

2. The device of claim 1 wherein said first plurality of anchors comprises a first anchor, a second anchor, a third anchor and a fourth anchor, wherein said first anchor and said second are arranged on one side of said first post and said third anchor and said fourth anchor are arranged on an opposite side of said first post.

3. The device of claim 2 wherein said second plurality of anchors comprises a fifth anchor, a sixth anchor and a seventh anchor, wherein a fifth anchor is arranged adjacent said third post, said sixth anchor is arranged on one end of said second cross arm, and said seventh anchor is arranged on an end of said second cross arm opposite said sixth anchor.

4. The device of claim 3 further comprising:
   a fourth post coupled between said first cross arm and said second cross arm, said fourth post having one end arranged adjacent said sixth anchor; and,
   a fifth post coupled between said first cross arm and said second cross arm, said fourth post having one end arranged adjacent said seventh anchor.

5. The device of claim 4 further comprising:
   a first brace coupled between said first post and said first cross arm, said first brace having a first end arranged adjacent to said second post and a second end arranged adjacent said fourth post; and,
   a second brace coupled between said first post and said first cross arm, said second brace having a first end arranged adjacent to said second post opposite said first brace and a second end arranged adjacent said fifth post.

* * * * *